United States Patent
Ma et al.

(10) Patent No.: US 12,332,757 B2
(45) Date of Patent: Jun. 17, 2025

(54) ELECTRONIC DEVICE, SERVER TESTING SYSTEM AND METHOD WITH ENVIRONMENT DETECTION HAVING A MODIFIED TEST SCRIPT OR TEST DRIVER PROGRAM SENT THROUGH USB

(71) Applicant: Fulian Precision Electronics (Tianjin) Co., LTD., Tianjin (CN)

(72) Inventors: Teng-Fei Ma, Tianjin (CN); Jie Yuan, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 38 days.

(21) Appl. No.: 18/513,953

(22) Filed: Nov. 20, 2023

(65) Prior Publication Data
US 2025/0068531 A1 Feb. 27, 2025

(30) Foreign Application Priority Data
Aug. 23, 2023 (CN) .......................... 202311076124.3

(51) Int. Cl.
*G06F 11/273* (2006.01)
(52) U.S. Cl.
CPC ................ *G06F 11/2733* (2013.01)
(58) Field of Classification Search
CPC ... G06F 11/2733; G06F 11/273; G06F 11/277
See application file for complete search history.

(56) References Cited

U.S. PATENT DOCUMENTS

| | | | | |
|---|---|---|---|---|
| 6,167,534 A | * | 12/2000 | Straathof | G06F 11/3414 714/E11.193 |
| 8,255,536 B2 | * | 8/2012 | Chen | H04L 47/808 709/226 |
| 2003/0204611 A1 | * | 10/2003 | McCosh | H04L 43/50 709/230 |
| 2013/0227177 A1 | * | 8/2013 | Cho | G06F 11/3051 710/16 |
| 2014/0282407 A1 | * | 9/2014 | Channamsetti | G06F 11/3688 717/124 |
| 2018/0287926 A1 | * | 10/2018 | Williams | H04L 41/082 |

(Continued)

FOREIGN PATENT DOCUMENTS

| | | |
|---|---|---|
| CN | 110764959 | 2/2020 |
| CN | 113742215 | 12/2021 |

(Continued)

*Primary Examiner* — Joseph O Schell
(74) *Attorney, Agent, or Firm* — ScienBiziP, P.C.

(57) ABSTRACT

The present application provides a server testing system. The server testing system includes an electronic device being connected to a touch screen configured to display a test item menu bar and being connected to a server through a universal serial bus (USB) port and I2C and UART ports. The electronic device is configured to generate configuration parameters for the server in response to a selection operation of a user to the test item menu bar; obtain a modified test script by configuring a test script according to the configuration parameters; send the modified test script to the server through the USB port; generate a test result by controlling the server to execute the modified test script; and send the test result to the touch screen for display and save the test result to external storage device.

12 Claims, 5 Drawing Sheets

(56) References Cited

U.S. PATENT DOCUMENTS

2020/0151090 A1\* 5/2020 McCormick ......... G06Q 10/103
2022/0138093 A1\* 5/2022 Yang ................... G06F 11/3688
　　　　　　　　　　　　　　　　　　717/124

FOREIGN PATENT DOCUMENTS

CN　　115098387　　9/2022
CN　　116467202　　7/2023

\* cited by examiner

ELECTRONIC DEVICE, SERVER TESTING SYSTEM AND METHOD WITH ENVIRONMENT DETECTION HAVING A MODIFIED TEST SCRIPT OR TEST DRIVER PROGRAM SENT THROUGH USB

FIELD

This present application relates to the field of testing technology, and in particular to a server testing system, a server testing method, and an electronic device.

BACKGROUND

In a field of server testing, a testing of a server system is different from testing a software or a hardware as the testing of the server system includes many test items and many test steps, and a plurality of testing tools and test cases are used during a testing process. Currently, most of test items rely on a tester who has a certain technical foundation to perform the test item manually.

In a case that there are too many servers to be tested and too many test items need to be performed, if the test items require the tester to perform the test items manually, it may result in a labor intensive problem. In addition, as a lot of fragmented tests are required between test items, and if the tester response slowly during the fragmented test, it may result a long test time, a low test efficiency, and an inconvenience for tracking the test and viewing the test result. Therefore, there is a room to improve the field of server testing.

DETAILED DESCRIPTION

Embodiments of the present application are described in detail below, examples of which are illustrated in the accompanying drawings, same or similar reference numerals represent same or similar elements or elements with the same or similar functions. The embodiments described below with reference to the drawings are exemplary and are only used to explain the present application and cannot be understood as limiting the present application.

Many specific details are set forth in the following description in order to fully understand the present application. The described embodiments are only some, but not all, of the embodiments of the present application. Based on the embodiments of the present application, all other embodiments obtained by those of ordinary skill in the art without creative efforts fall within the scope of protection of the present application.

In the description of the present application, unless defined otherwise, all technical and scientific terms used herein have the same meanings as commonly understood by a person skilled in the art to which the application belongs. The terminology used herein in the description of the application is for the purpose of describing specific embodiments only and is not intended to limit the application.

In the embodiments of the present application, it should be noted that, unless otherwise explicitly stated or limited, words such as "exemplary" or "for example" are used to represent examples, illustrations or explanations. Any embodiment or design described as "exemplary" or "for example" in the embodiments of the present application is not to be construed as preferred or advantageous over other embodiments or designs. Rather, use of words such as "exemplary" or "for example" is intended to present related concepts in a concrete manner. In the case of no conflict, the following embodiments and features in the embodiments can be combined with each other.

In the embodiments of the present application, it should be noted that, unless otherwise explicitly stated and limited, terms "installation", "connection", and "connect" should be understood in a broad sense. For example, it can be a fixed connection or a detachable connection; it can be a mechanical connection, an electrical connection or mutual communication; it can be a direct connection or an indirect connection through an intermediate medium; it can be an internal connection between two components or an interaction relationship between two elements. Those of ordinary skill in the art can understand the specific meanings of the above terms in the present application according to specific situations.

The following disclosure provides many different embodiments or examples for implementing the various structures of the present application. To simplify the disclosure of the present application, the components and arrangements of specific examples are described below. Of course, they are merely examples and are not intended to limit the application. Furthermore, the present application may repeat reference numbers and/or reference letters in different examples, such repetition being for the purposes of simplicity and clarity and does not by itself indicate a relationship between the various embodiments and/or arrangements discussed.

In order to more clearly understand the above objects, features and advantages of the present application, the present application will be described in detail below in conjunction with the accompanying drawings and specific embodiments. It should be noted that, in the case of no conflict, the embodiments of the present application and the features in the embodiments can be combined with each other.

At present, in a standardized testing of a server, an existing testing method includes: first checking and configuring a test environment on a server by a tester having a certain basic knowledge, then executing a test script corresponding to the standardized testing, and finally summarizing a test result. The existing testing method requires conducting technical training for the tester, which has a high labor cost, and requires manual operation to complete the test in an entire test process, which results in low testing efficiency. Additionally, for some tests, a breadth of testing is high but a frequency of testing is low. For example, for a graphics processing unit (GPU) bandwidth testing required by many departments, the frequency of the GPU bandwidth testing is very low, which results in a need for a lot of repetitive training for the testers and a high cost for the repetitive training. In addition, a time discontinuity and a lot of fragmented tests are required in server testing, which results in a long test time, and further results in low testing efficiency.

In order to solve the above problems, embodiments of the present application provide a server testing system, a server testing method, an electronic device, and a computer readable storage medium. The server testing method according to the embodiment of the present application can be applied to the electronic device of the server testing system. The following is an introduction based on an application scenario according to the embodiments of the present application.

Figure 1:
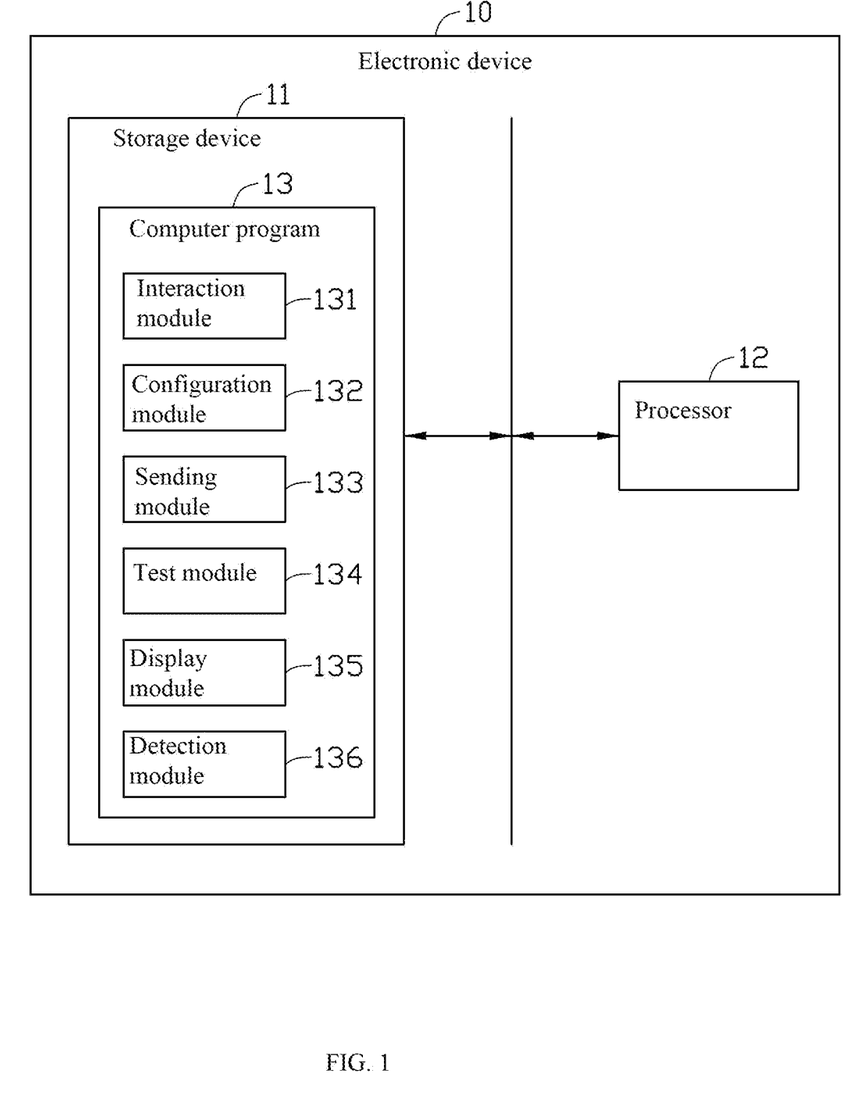
FIG. 1 is a schematic structural diagram of an electronic device according to an embodiment of the present application.

Please refer to FIG. 1, which is a schematic structural diagram of an electronic device 10 according to one embodiment of the present application.

Specifically, the electronic device 10 includes, but is not limited to: a storage device 11, a processor 12, and a computer program 13 stored in the storage device 11 and executable by the processor 12. The computer program 13 can be a program used for testing a server 20 shown in FIG. 2.

Exemplarily, the computer program 13 can be divided into one or more modules/units, such as an interaction module 131, a configuration module 132, a sending module 133, a test module 134, a display module 135, and a detection module 136. The one or more modules/units are stored in the storage device 11 and executed by the processor 12 to realize a function according to the present application. The one or more modules/units may be a series of instruction segments of computer program capable of completing specific functions, and the instruction segments are used to describe a process of obtaining the computer program 13 in the electronic device 10.

Hardware of the electronic device 10 includes, but is not limited to: a microprocessor, an application specific integrated circuit (ASIC), a field-programmable gate array (FPGA), a digital signal processor (DSP), an embedded device, etc.

The electronic device 10 may be a microcontroller (such as an STM32 microcontroller, a PIC microcontroller, an 8051 microcontroller, an AVR microcontroller) or an embedded chip (such as an ARM Cortex chip). This application does not limit a type of the electronic device 10.

A network where the electronic device 10 is located includes, but is not limited to: Internet, a wide area network, a metropolitan area network, a local area network, a virtual private network (VPN), etc.

Figure 2:
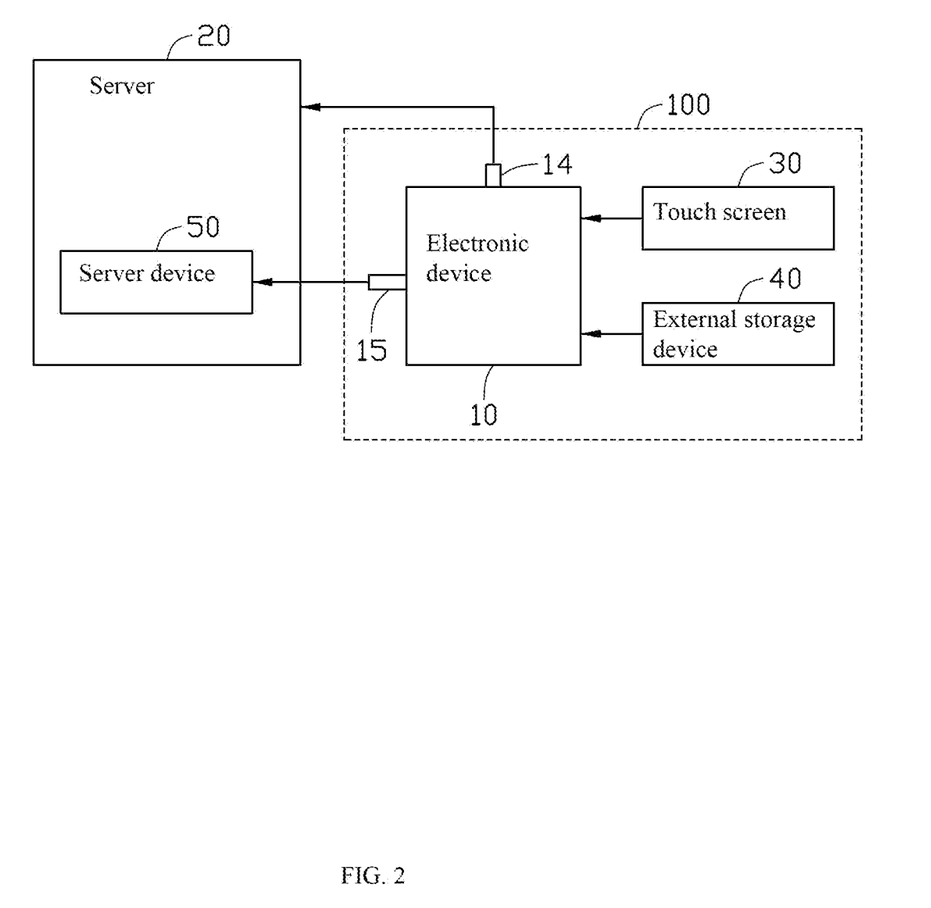
FIG. 2 is a schematic structural diagram of a server testing system according to an embodiment of the present application.

Please refer to FIG. 2, which is a schematic structural diagram of a server testing system 100 according to one embodiment of the present application.

Specifically, the server testing system 100 includes the electronic device 10 and a touch screen 30. The electronic device 10 has a universal serial bus (USB) port 14. The electronic device 10 is connected to the server 20 through the USB port 14. The touch screen 30 is communicatively connected to the electronic device 10, and the touch screen 30 is used to display a test item menu bar. The electronic device 10 includes the interaction module 131, the configuration module 132, the sending module 133, the test module 134, the display module 135, and the detection module 136. The interaction module 131 is used to respond to a selection operation of a user on the test item menu bar through the touch screen 30 and generate configuration parameters for the server 20 according to the selection operation. The configuration module 132 is used to modify a pre-stored test script according to the configuration parameters to obtain a modified test script. The sending module 133 is configured to send the modified test script to the server 20 through the USB port 14. The test module 134 is used to control the server 20 to execute the modified test script and generate a test result. The display module 135 is used to send the test result to the touch screen 30 for display.

In one embodiment, the electronic device 10 may be a STM32F407 microcontroller that supports functions of a USB host and a USB device. In other embodiments of this application, another embedded chip can be used to replace the STM32F407 microcontroller according to actual needs.

In the above embodiment, the electronic device 10 can communicate with the server 20 through the USB port 14, and then perform functions of file transfer and system control between the electronic device 10 and the server 20, and deploy an automated testing of the server 20, the present application has a strong applicability, a small module size, and no usage restrictions, which reduces the difficulty of training the testers, improves the testing efficiency, and saves the labor cost and testing resources.

In some embodiments, in order to reduce the difficulty of operation for testers, a control system of the touch screen 30 adopts a multi-level tree topology. In the embodiment of the present application, the test item menu bar displayed on the touch screen 30 is a three-level menu, a first level menu of the three-level menu includes content (e.g., names) of test items, a second level menu of the three-level menu includes types of the test items or a "Start" option, and a third level menu of the three-level menu includes the "Start" option. When a signal generated when a user (i.e., the tester) clicks the "Start" option is received, a configuration of test parameters can be determined, that is, the interaction module 131 can generate configuration parameters based on user's selection from the test item menu bar.

Figure 3:
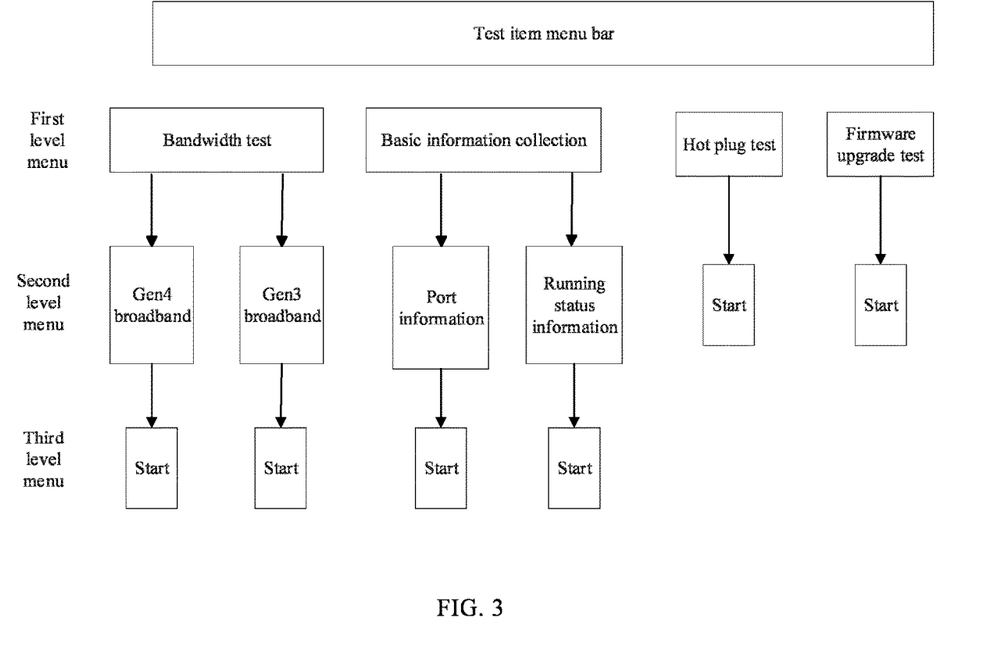
FIG. 3 is a topological structure diagram of a test item menu bar displayed on a touch screen shown in FIG. 2.

Combined with FIG. 3, the following takes four different test items as examples. The four test items include a bandwidth test, a basic information collection, a hot plug test, and a firmware upgrade test.

In an embodiment of the present application, if the bandwidth test is selected in the first level menu, it is further necessary to select a broadband type in the second level menu. For example, broadband types can be selected to include, but are not limited to, a Gen4 broadband, and a Gen3 broadband. When the broadband type is selected, the "Start" option can be selected in the third level menu.

In an embodiment of the present application, if the basic information collection is selected in the first level menu, it is further necessary to select an information type in the second level menu. For example, the information types can be selected in the second level menu can include, but are not limited to, port information, and running status information. When the information type is selected in the second level menu, the "Start" option can be selected in the third level menu.

In an embodiment of the present application, if the hot plug test is selected in the first level menu, the "Start" option can be directly selected in the second level menu.

In an embodiment of the present application, if the firmware upgrade test is selected in the first level menu, the "Start" option can be directly selected in the second level menu.

In the above embodiment, the user (i.e., the tester) can select information of a test item (e.g., the name and the type of the test item) through the test item menu bar displayed on the touch screen 30, and then the interaction module 131 configures test parameters in response to user's selection operation on the test item menu bar. That is, the present application is convenient for interaction between the tester and the sever testing system 100, and can be realized with offline operation, precise control, and accurate output. In addition, the touch screen 30 is used to visualize the testing process, reduce the difficulty of operation for testers through interactive graphical interface, simplify the training difficulty for testers, further improve testing efficiency, and save the labor cost.

In some embodiments, the touch screen 30 displays a button for directly triggering the test. When the tester selects information of each of a plurality test items through the test item menu bar, and the interactive module 131 generates the configuration parameters of each of the plurality of test items according to the selected information of each test item. When the tester clicks the button, the electronic device 10 performs tests corresponding to the plurality of test items according to the configuration parameters of each test item, thereby reaching an automatic server testing which reduces the difficulty of training for testers, saves the labor cost and test resources, and improves the test efficiency.

In some embodiments of the present application, the detection module 136 is used to detect whether an environment configuration of the server 20 meets a requirement of a test environment. If the environment configuration of the server 20 does not meet the requirement of the test environment, the sending module 133 is further used to send a test driver program to the server 20 through the USB port 14 and install the test driver program to the server 20.

For example, the test of the server 20 may include, but is not limited to, (1) basic function testing, such as accessing web pages, sending emails, processing files through the server 20, etc.; (2) a performance testing, such as a response time, a throughput, a number of concurrent users of the server 20, etc.; (3) a security testing, such as testing vulnerabilities, an identity verification, an authorization of the server 20, etc.; (4) a reliability testing, such as a stability, an availability, a fault tolerance of the server 20, etc.

In some embodiments of the present application, the server testing system 100 further includes a storage device 40 (hereinafter referred to as "external storage device") externally connected to the electronic device 100. The external storage device 40 is used to store test scripts, the test driver program and test results. The external storage device 40 may include, but is not limited to, a memory card and a USB flash drive.

In the above embodiment, the external storage device 40 is used to pre-store the test driver programs, test scripts for building the test environment, and the test results generated by executing the test scripts, thereby saving a time required for on-site debugging and improving the test efficiency.

In some embodiments of the present application, the server 20 includes a server device 50, the electronic device 10 further includes a communication interface 15. The electronic device 10 connects to the server device 50 and controls the server device 50 through the communication interface 15. For example, the communication interface 15 includes but is not limited to a UART port and an I2C bus interface. In this embodiment, the electronic device 10 connects to and controls the server device 50 through the UART port or the I2C bus interface.

In the above embodiment, the electronic device 10 can directly control the server device 50 for testing through the UART port or the I2C bus interface without sending the test script to the server 20.

Figure 4:
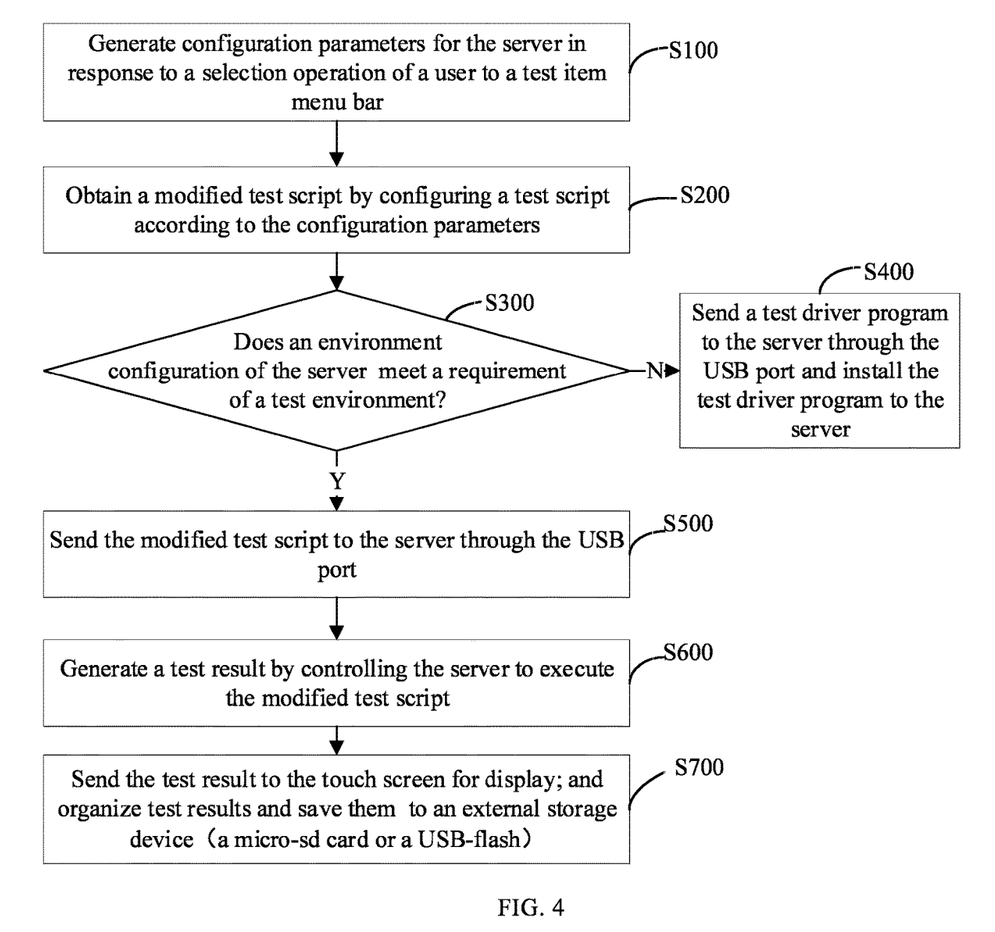
FIG. 4 is a flow chart of a server inband testing method according to an embodiment of the present application.

Please refer to FIG. 4, which is a flow chart of a server inband testing method according to an embodiment of the present application. In this application, according to different needs, an order of blocks in the flow chart can be adjusted according to actual requirements, and some of the blocks can be omitted.

In this embodiment, an execution subject of the server testing method may be the electronic device 10 of the server testing system 100 shown in FIG. 2, and the electronic device 10 is communicatively connected with the server 20 through the USB port 14.

In some embodiments, before the electronic device 10 executes the server testing method, the server testing system 100 needs to complete function initialization, for example, the complete functions initialization of the USB port 14, the communication interface 15, the touch screen 30, etc.

The server testing method includes the following blocks.

Block S100, the electronic device 10 generates configuration parameters for the server 20 in response to a selection operation of a user to a test item menu bar.

In one embodiment, the electronic device 10 generates the configuration parameters for the server 20 based on information of a test item selected by a user (such as a tester) from the test item menu bar displayed on touching the touch screen 30.

Specifically, the electronic device 10 is connected to the touch screen 30, and the electronic device 10 displays the test item menu bar on an interactive interface of the touch screen 30. In the above embodiment, the user (i.e., the tester) can select information of the test item (e.g., the name and the type of the test item) through the test item menu bar displayed on the touch screen 30, and then the electronic device 10 can generate the configuration parameters based on the information of the test item. In one embodiment, the configuration parameters include, but are not limited to, the name of the test item, the type of the test item, a test tool name, an installation directory, an operating system, etc.

Block S200, the electronic device 10 obtains a modified test script by configuring a test script according to the configuration parameters.

Specifically, the electronic device 10 is connected to the external storage device 40, and the test script is pre-stored in the external storage device 40. The electronic device 10 configures the test script according to the configuration parameters. For example, the electronic device 10 may configure the test script according to the name of the test item and the type of the test item in the configuration parameters, and obtain the modified test script. The external storage device 40 may include, but is not limited to, a memory card and a USB flash drive.

Block S300, the electronic device 10 determines whether an environment configuration of the server 20 meets a requirement of a test environment.

In some embodiments, if the environment configuration of the server 20 does not meet the requirement of the test environment, the process goes to block S400. If the environment configuration of the server 20 meets the requirement of the test environment, the process goes to block S500.

In one embodiment, determining whether the environment configuration of the server 20 meet the requirement of the test environment may include, but is not limited to, detecting whether a software or an application installed on the server 20 is the same as or similar to a software or an application required in the test environment. The software or the application can be used to execute the modified test script. The software or the application required in the test environment can be predetermined by the electronic device 10. In one embodiment, the electronic device 10 can predetermine the software or the application required in the test environment according to the name and the type of a corresponding test item.

Specifically, if the software or the application is installed in the server 20, the electronic device 20 can determine that the environment configuration of the server 20 meets the requirement of the test environment. If the software or the application has not been installed in the server 20, the electronic device 20 can determine that the environment configuration of the server 20 does not meet the requirement of the test environment.

Block S400, the electronic device 10 sends a test driver program to the server 20 through the USB port 14 and installs the test driver program to the server 20.

Specifically, the test driver program is used for building the test environment, and is pre-stored in the external storage device 40. If the environment configuration of the server 20 does not meet the requirement of the test environment, the electronic device 10 sends the test driver program to the server 20. The electronic device 10 completes a configuration of the test environment by controlling the server 20 to install the test driver program, to enable the environment configuration of the server 20 meet the requirement of the test environment. Among them, the specific content of the test driver program is determined by environmental requirements for executing the modified test script.

Block S500, the electronic device 10 sends the modified test script to the server 20 through the USB port 14.

Specifically, the USB port 14 is used to perform functions of file transfer between the electronic device 10 and the server 20 and has strong applicability.

Block S600, the electronic device 10 generates a test result by controlling the server 20 to execute the modified test script.

Specifically, executing the modified test script may include, but is not limited to, (1) basic function testing, such as accessing web pages, sending emails, processing files, collecting basic information through the server 20, etc.; (2) a performance testing, such as a response time, a throughput, a number of concurrent users of the server 20, a hot plug test, a bandwidth test, etc.; (3) a security testing, such as testing vulnerabilities, an identity verification, an authorization of the server 20, a firmware upgrade test, etc.; and/or (4) a reliability testing, such as a stability, an availability, a fault tolerance of the server 20, etc.

In some embodiments, the test result can include, but is not limited to, (1) a response time: a time required for the server 20 to respond to a request, and the request includes a control request of the electronic device 10 controlling the server 20 to perform the modified test script; (2) a status code: a HTTP response code, which is indicating whether the server 20 successfully processes the control request; (3) a data transmission amount: a number of bytes returned by the server 20 in response to the control request; (4) an error log: recording errors or exceptions that occur when the server 20 processes the control request; (5) utilization of hardware resources: a CPU usage, a memory usage and a disk space of the server 20; (6) a network delay: data transmission time from the electronic device 10 to the server 20; (7) an average load: a workload being processed by the server 20.

Block S700, the electronic device 10 sends the test result to the touch screen 30 for display, and organizes the test result and saves the test result to an external storage device (e.g., a micro-sd card or a USB-flash).

Specifically, the touch screen 30 is used to visualize the test result, reduce the operation difficulty for the tester through the interactive graphical interface, simplify the difficulty of training the tester, further improve the test efficiency, and save the labor cost.

In one embodiment of the present application, after the test result is generated, the server testing method further includes: determining whether the test result is consistent with preset standard data. In some embodiments, if the test result is inconsistent with the preset standard data, the electronic device can determine that a working status of the server 20 is abnormal, and can end the test. In some embodiments, if the test result is consistent with the preset standard data, the electronic device can determine that the working status of the server 20 is normal.

Specifically, the preset standard data can be set by the electronic device 10 in response to user input according to actual test requirements. The preset standard data may include, but is not limited to, a standard CPU usage, a standard memory usage, a standard disk space utilization, a standard network traffic, a standard response time, a standard data transmission volume, and/or a standard average load.

Specifically, the electronic device 10 can determine a performance load of the server 20 by comparing a CPU usage of the server 20 with the standard CPU usage. The electronic device 10 can determine a resource consumption of the server 20 by comparing a current memory usage of the server 20 with the standard memory usage. The electronic device 10 can determine a data storage situation of the server 20 by comparing a current disk space utilization of the server 20 with the standard disk space utilization. The electronic device 10 can determine a current network transmission speed and a bandwidth usage of the server 20 by comparing a current network traffic of the server 20 with the standard network traffic, so as to determine a network performance of the server 20. The electronic device 10 can determine a response time required by the server 20 for a request by comparing the response time responding the control request with the standard response time. The electronic device 10 can determine a number of bytes returned by the server 20 by comparing a data transmission volume of server 20 with the standard data transmission volume. The electronic device 10 can determine a workload being processed by the server 20 by comparing an average load of the server 20 with the standard average load.

In one embodiment of the present application, when the test result is generated, the electronic device 10 further can save the test result to the external storage device 40.

In the server testing method provided in the above embodiment, the electronic device 10 packages a test process into test script in advance and saves the test script, the test script can be automatically executable. The electronic device 10 then connects to the server 20 via the USB port 14 of the electronic device 10, so as to automatically execute the server testing method and generate the test result. That is, the server testing method can be used to automate the testing of the server 20, which simplifies the testing process, reduces the difficulty of training testers, improves testing efficiency, saves labor cost and testing resources, and can monitor the test result at any time, and has a strong applicability.

Figure 5:
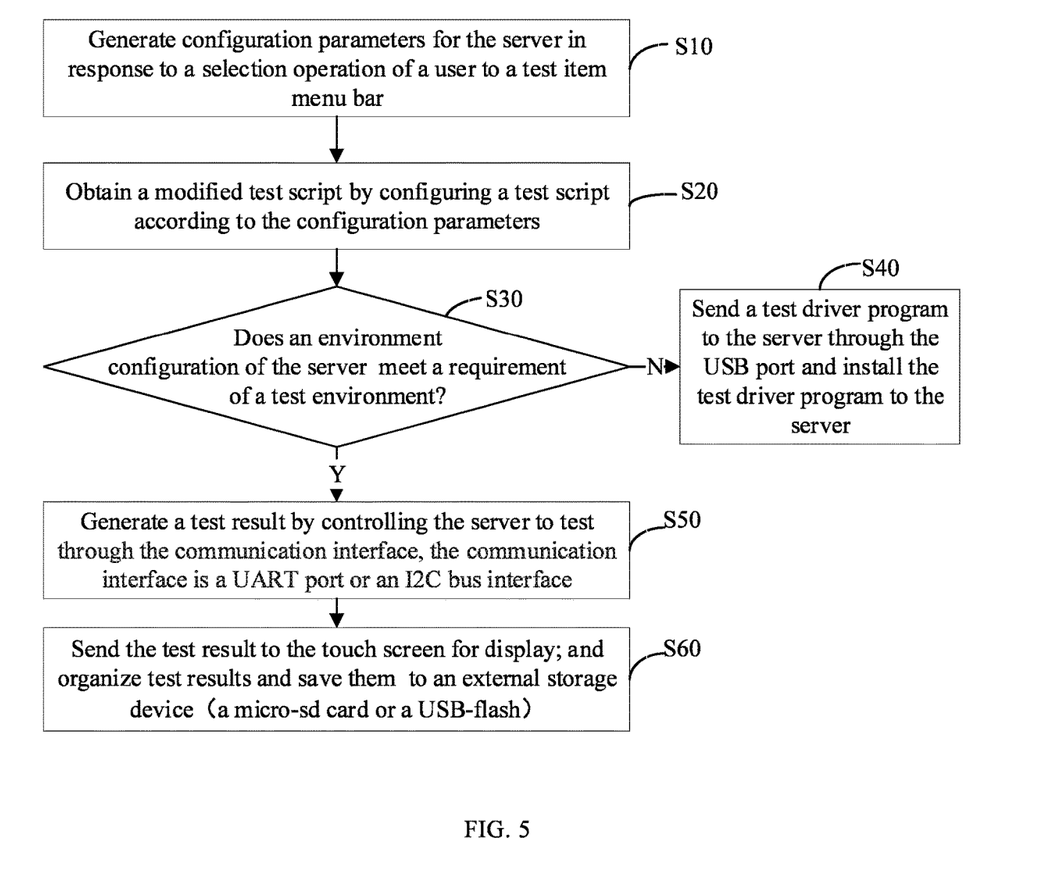
FIG. 5 is a flow chart of another server outband testing method according to an embodiment of the present application.

Please refer to FIG. 5, which is a flow chart of a server testing method according to another embodiment of the present application. In this application, according to different needs, the order of blocks in the flow chart can be adjusted according to actual requirements, and some of the blocks can be omitted.

In this embodiment, the execution subject of the server testing method may be the electronic device 10 of the server testing system 100 shown in FIG. 2, and the electronic device 10 is communicatively connected to the server 20 which is to be tested through the USB port 14.

In this embodiment, the server 20 includes the server device 50, and the server test system 100 further includes a communication interface 15. The electronic device 10 connects to and controls the server device 50 through the communication interface 15.

In some embodiments, before the electronic device 10 executes the server testing method, the server testing system 100 needs to complete function initialization, for example, complete function initialization of the USB port 14, the communication interface 15, and the touch screen 30, etc.

The server testing method includes the following blocks.

Block S10, the electronic device 10 generates configuration parameters for the server 20 in response to a selection operation of a user to a test item menu bar.

In one embodiment, the electronic device 10 generates the configuration parameters for the server 20 based on information of a test item selected by a user (such as a tester) from the test item menu bar displayed on touching the touch screen 30.

Specifically, the electronic device 10 is connected to the touch screen 30, and the electronic device 10 displays the test item menu bar on an interactive interface of the touch screen 30. In the above embodiment, the user (i.e., the tester) can select information of the test item (e.g., the name and the type of the test item) through the test item menu bar displayed on the touch screen 30, and then the electronic device 10 can generate the configuration parameters based on the information of the test item. In one embodiment, the configuration parameters include, but are not limited to, the name of the test item, the type of the test item, a test tool name, an installation directory, an operating system, etc.

Block S20, the electronic device 10 obtains a modified test script by configuring a test script according to the configuration parameters.

In one embodiment, the electronic device 10 can package a test process of testing the server into the test script in advance and saves the test script, such that by executing the test script, the testing of the server 20 can be automatically executed.

Specifically, the electronic device 10 is connected to the external storage device 40, and the test script is pre-stored in the external storage device 40. The electronic device 10 configures the test script according to the configuration parameters. For example, the electronic device 10 may configure the test script according to the name of the test item and the type of the test item in the configuration parameters, and obtain the modified test script. The external storage device 40 may include, but is not limited to, a memory card and a USB flash drive.

Block S30, the electronic device 10 determines whether an environment configuration of the server 20 meets a requirement of a test environment.

In some embodiments, if the environment configuration of the server 20 does not meet the requirement of the test environment, the process goes to block S40. If the environment configuration of the server 20 meets the requirement of the test environment, the process goes to block S50.

In one embodiment, determining whether the environment configuration of the server 20 meet the requirement of the test environment may include, but is not limited to, detecting whether a software or an application installed on the server 20 is the same as or similar to a software or an application required in the test environment. The software or the application can be used to execute the modified test script. The software or the application required in the test environment can be predetermined by the electronic device 10. In one embodiment, the electronic device 10 can predetermine the software or the application required in the test environment according to the name and the type of a corresponding test item.

Specifically, if the software or the application is installed in the server 20, the electronic device 20 can determine that the environment configuration of the server 20 meets the requirement of the test environment. If the software or the application has not been installed in the server 20, the electronic device 20 can determine that the environment configuration of the server 20 does not meet the requirement of the test environment.

Block S40, the electronic device 10 sends a test driver program to the server 20 through the USB port 14 and installs the test driver program to the server 20.

Specifically, the test driver program is used for building the test environment, and is pre-stored in the external storage device 40. If the environment configuration of the server 20 does not meet the requirement of the test environment, the electronic device 10 sends the test driver program to the server 20. The electronic device 10 completes a configuration of the test environment by controlling the server 20 to install the test driver program, to enable the environment configuration of the server 20 meet the requirement of the test environment. Among them, the specific content of the test driver program is determined by environmental requirements for executing the modified test script.

Block S50, the electronic device 10 generates a test result by controlling the server device 50 to test through the communication interface 15. In one embodiment, the electronic device 10 controls the server device 50 using an outbound method.

In one embodiment, the electronic device 10 can control the server device 50 to test based on the modified test script through the communication interface 15.

For example, the communication interface 15 includes but is not limited to a UART port and an I2C bus interface. In this embodiment, the electronic device 10 connects to and controls the server device 50 through the UART port or the I2C bus interface.

For example, controlling the server device 50 to test may include, but is not limited to, (1) basic function testing, such as accessing web pages, sending emails, processing files, collecting basic information through the server 20, etc.; (2) a performance testing, such as a response time, a throughput, a number of concurrent users of the server 20, a hot plug test, a bandwidth test, etc.; (3) a security testing, such as testing vulnerabilities, an identity verification, an authorization of the server 20, a firmware upgrade test, etc.; and/or (4) a reliability testing, such as a stability, an availability, a fault tolerance of the server 20 etc.

In some embodiments, the test result can include, but is not limited to, (1) a response time: a time required for the server 20 to respond to a request, and the request includes a control request of the electronic device 10 controlling the server 20 to perform the modified test script; (2) a status code: a HTTP response code, which is indicating whether the server 20 successfully processes the control request; (3) a data transmission amount: a number of bytes returned by the server 20 in response to the control request; (4) an error log: recording errors or exceptions that occur when the server 20 processes the control request; (5) utilization of hardware resources: a CPU usage, a memory usage and a disk space of the server 20; (6) a network delay: data transmission time from the electronic device 10 to the server 20; (7) an average load: a workload being processed by the server 20.

Block S60, the electronic device 10 sends the test result to the touch screen 30 for display, and organizes the test result and saves the test result to an external storage device (e.g., a micro-sd card or a USB-flash).

Specifically, the touch screen 30 is used to visualize the test result, reduce the operation difficulty for the tester through the interactive graphical interface, simplify the difficulty of training the tester, further improve the test efficiency, and save the labor cost.

In one embodiment of the present application, after the test result is generated, the server testing method further includes: determining whether the test result is consistent with preset standard data. In some embodiments, if the test result is inconsistent with the preset standard data, the electronic device can determine that a working status of the server 20 is abnormal, and can end the test. In some embodiments, if the test result is consistent with the preset standard data, the electronic device can determine that the working status of the server 20 is normal.

Specifically, the preset standard data can be set by the electronic device 10 in response to user input according to actual test requirements. The preset standard data may include, but is not limited to, a standard CPU usage, a standard memory usage, a standard disk space utilization, a standard network traffic, a standard response time, a standard data transmission volume, and/or a standard average load.

Specifically, the electronic device 10 can determine a performance load of the server 20 by comparing a CPU usage of the server 20 with the standard CPU usage. The electronic device 10 can determine a resource consumption of the server 20 by comparing a current memory usage of the server 20 with the standard memory usage. The electronic device 10 can determine a data storage situation of the server 20 by comparing a current disk space utilization of the server 20 with the standard disk space utilization. The electronic device 10 can determine a current network transmission speed and a bandwidth usage of the server 20 by comparing a current network traffic of the server 20 with the standard network traffic, so as to determine a network performance of the server 20. The electronic device 10 can determine a response time required by the server 20 for a request by comparing the response time responding the control request with the standard response time. The electronic device 10 can determine a number of bytes returned by the server 20 by comparing a data transmission volume of server 20 with the standard data transmission volume. The electronic device 10 can determine a workload being processed by the server 20 by comparing an average load of the server 20 with the standard average load.

In one embodiment of the present application, when the test result is generated, the electronic device 10 further can save the test result to the external storage device 40.

In the server testing method provided in the above embodiment, the electronic device 10 packages a test process into test script in advance and saves the test script, the test script can be automatically executable. The electronic device 10 then connects to the server 20 via the USB port 14 of the electronic device 10, so as to automatically execute the server testing method and generate the test result. That is, the server testing method can be used to automate the testing of the server 20, which simplifies the testing process, reduces the difficulty of training testers, improves testing efficiency, saves labor cost and testing resources, and can monitor the test result at any time, and has a strong applicability.

In one embodiment, the processor 12 of the testing device 10 shown in FIG. 1 may be a central processing unit (CPU), or other general purpose processor, digital signal processor (DSP), application specific integrated circuit (ASIC), field-programmable gate array (FPGA), or other programmable logic devices, discrete gate or transistor logic devices, discrete hardware components, etc. The general purpose processor may be a microprocessor. The processor 12 can also be any conventional processor. The processor 12 is a computing core and a control center of the electronic device 10, and uses various interfaces and lines to connect various parts of the electronic device 10, and obtain the operating system, various installed applications, program codes of the electronic device 10, etc.

The processor 12 obtains the application program to implement the blocks in each of embodiments of the server testing method, such as implement the blocks shown in FIG. 4 and FIG. 5.

The storage device 11 can be used to store a computer program 13 and/or modules. The processor 12 executes or obtains the computer program 13 and/or modules stored in the storage device 11, and calls data stored in the storage device 11 to implement various functions of the electronic device 10. The storage device 11 may mainly include a first area for storing computer programs and a second area for storing data, the first area may store an operating system, an application required for at least one function, etc.; the second area may store data created during the running of the electronic device 10. In addition, the storage device 11 may include a non-volatile memory, such as a hard disk, a memory, a plug-in hard disk, a smart media card (SMC), a secure digital (SD) card, a flash card, at least one disk storage device, a flash memory device, or any other non-transitory storage medium.

If integrated modules/units of the electronic device 10 are implemented in a form of software functional units and sold or used as independent products. Based on this understanding, the present application can implement all or part of the processes in the methods of the above embodiments, which can also be completed by instructing relevant hardware through the computer program 13. The computer program 13 can be stored in a computer readable storage medium. When the computer program 13 is executed by the processor 12, it can implement the blocks of each of the above method embodiments.

Among them, the computer program 13 includes computer program code, and the computer program code can be in the form of source code, object code, retrievable files, or some intermediate form.

In some embodiments, as shown in FIG. 1, the storage device 11 of the electronic device 10 stores a plurality of instructions to implement the server testing method.

Specifically, the implement of the processor 12 executing the plurality of instructions can refer to the corresponding embodiment as shown in FIG. 4 and FIG. 5, which will not be described again here.

The present application embodiment also provides a computer readable storage medium in which at least one instruction is stored and executed by the processor 12 of the electronic device 10 to implement the server testing method as described in the above embodiment. The computer readable medium may include any entity or device capable of carrying computer program codes, recording medium, portable hard disk, magnetic disk, optical disc, computer memory, read-only memory (ROM), etc.

In the several embodiments provided in the present application, it should be understood that the disclosed systems, devices and methods can be implemented in other ways. For example, the device embodiments described above are only illustrative. For example, the division of modules is only a logical function division, and there may be other division methods in actual implementation.

Modules described as separate components may or may not be physically separated, and components shown as modules may or may not be physical units, that is, they may be located in one place, or they may be distributed to multiple network units. Some or all of the modules can be selected according to actual needs to achieve the purpose of the solution of this embodiment.

Each functional module in various embodiments of the present application can be integrated into one unit, or each unit can exist physically alone, or two or more units can be integrated into one unit. The above mentioned integrated unit can be implemented in the form of hardware or in the form of hardware plus software function modules.

Therefore, the embodiments should be regarded as illustrative and non-restrictive from any point of view, and the scope of the application is defined by the appended claims rather than the above description, and it is therefore intended that all claims falling within the claims. All changes within the meaning and scope of the equivalent elements are included in the present application. Any accompanying reference signs in the claims shall not be construed as limiting the claim in question.

Furthermore, it is clear that the word "including" does not exclude other elements or blocks, and the singular does not exclude the plural. A plurality units or devices stated in the present application may also be implemented by one unit or device through software or hardware. The words "first", "second", etc. are used to indicate names and do not indicate any specific order.

Finally, it should be noted that the above embodiments are only used to illustrate the technical solutions of the present application and are not limiting. Although the present application has been described in detail with reference to the preferred embodiments, those of ordinary skill in the art should understand that the technical solutions of the present application can be modified. Modifications or equivalent substitutions may be made without departing from the spirit and scope of the technical solution of the present application.

What is claimed is:

1. A server testing system, comprising:
   an electronic device comprising a universal serial bus (USB) port, the electronic device being communicatively connected to a server through the USB port;
   a touch screen, being communicatively connected to the electronic device and configured to display a test item menu bar;
   an external storage device communicatively connected to the electronic device, and configured to pre-store a test script and a test driver program;
   wherein the electronic device is configured to:
   generate configuration parameters for the server in response to a selection operation of a user to the test item menu bar;
   obtain a modified test script by configuring the test script according to the configuration parameters;
   determine whether an environment configuration of the server meets a requirement of a test environment; and
   in response to the environment configuration of the server not meeting the requirement of the test environment, send the test driver program to the server through the USB port and install the test driver program to the server to enable the environment configuration of the server to meet the requirement of the test environment;
   send the modified test script to the server through the USB port in response to the environment configuration of the server meeting the requirement of the test environment;
   generate a test result by controlling the server to execute the modified test script; and
   send the test result to the touch screen for display, organize the test result, and save the test result to the external storage device.

2. The server testing system according to claim 1, wherein the external storage device is a micro-sd card or a USB-flash.

3. The server testing system according to claim 1, wherein the electronic device determines whether the environment configuration of the server meets the requirement of the test environment by:
   determining that the environment configuration of the server meets the requirement of the test environment in response that a software or an application being used to execute the modified test script has been installed in the server;
   determining that the environment configuration of the server does not meet the requirement of the test environment in response that the software or the application being used to execute the modified test script has not been installed in the server.

4. The server testing system according to claim 1, wherein the server comprises a server device, and the electronic device further comprises:
   a communication interface, being configured for establishing a connection between the electronic device and the server device, the electronic device controlling the server device through the communication interface.

5. A server testing method applied to an electronic device, comprising:
   generating configuration parameters for a server in response to a selection operation of a user to a test item menu bar;
   obtaining a modified test script by configuring a test script according to the configuration parameters, wherein the test script is pre-stored in an external storage device communicatively connected to the electronic device;
   determining whether an environment configuration of the server meets a requirement of a test environment; and
   in response to the environment configuration of the server not meeting the requirement of the test environment, sending a test driver program to the server through a universal serial bus (USB port and install the test driver program to the server to enable the environment configuration of the server to meet the requirement of the test environment, the test driver program being pre-stored in the external storage device;
   sending the modified test script to the server through the USB port in response to the environment configuration of the server meeting the requirement of the test environment;
   generating a test result by controlling the server to execute the modified test script; and
   sending the test result to a touch screen for display, organizing the test result, and saving the test result to the external storage device.

6. The server testing method according to claim 5, wherein the external storage device is a micro-sd card or a USB-flash.

7. The server testing method according to claim 5, further comprising:
determining whether the test result is consistent with preset standard data;
determining that a working status of the server is abnormal in response to the test result being inconsistent with the preset standard data; and
determining that the working status of the server is normal in response to the test result being consistent with the preset standard data.

8. The server testing method according to claim 5, wherein determining whether the environment configuration of the server meets the requirement of the test environment comprises:
determining that the environment configuration of the server meets the requirement of the test environment in response that a software or an application being used to execute the modified test script has been installed in the server;
determining that the environment configuration of the server does not meet the requirement of the test environment in response that the software or the application being used to execute the modified test script has not been installed in the server.

9. An electronic device, comprising:
at least one processor;
a storage device, being stored with at least one program, which when executed by the at least one processor, cause to the at least one processor to:
generate configuration parameters for a server in response to a selection operation of a user to a test item menu bar;
obtain a modified test script by configuring a test script according to the configuration parameters, the test script being pre-stored in an external storage device communicatively connected to the electronic device;
determine whether an environment configuration of the server meets a requirement of a test environment; and
in response to the environment configuration of the server not meeting the requirement of the test environment, send a test driver program to the server through a universal serial bus (USB) port and install the test driver program to the server to enable the environment configuration of the server to meet the requirement of the test environment, the test driver program being pre-stored in the external storage device;
send the modified test script to the server through the USB port in response to the environment configuration of the server meeting the requirement of the test environment;
generate a test result by controlling the server to execute the modified test script; and
send the test result to a touch screen for display.

10. The electronic device according to claim 9, wherein the external storage device is a micro-sd card or a USB-flash.

11. The electronic device according to claim 9, wherein the at least one processor is further caused to:
determine whether the test result is consistent with preset standard data;
determine that a working status of the server is abnormal in response that the test result is inconsistent with the preset standard data; and
determine that the working status of the server is normal in response that the test result is consistent with the preset standard data.

12. The electronic device according to claim 9, wherein the at least one processor is further caused to:
save the test result to the external storage device;
wherein the at least one processor determines whether the environment configuration of the server meets the requirement of the test environment by:
determining that the environment configuration of the server meets the requirement of the test environment in response that a software or an application being used to execute the modified test script has been installed in the server;
determining that the environment configuration of the server does not meet the requirement of the test environment in response that the software or the application being used to execute the modified test script has not been installed in the server.

* * * * *